US005739179A

United States Patent [19]
Chiou et al.

[11] Patent Number: 5,739,179
[45] Date of Patent: Apr. 14, 1998

[54] GRAFTED POLYMER COMPOSITION

[75] Inventors: Shang Jaw Chiou; Miao-Hsun Li Sheng, both of Lower Gwynedd, Pa.

[73] Assignee: Rohm and Haas Company, Philadelphia, Pa.

[21] Appl. No.: 684,075

[22] Filed: Jul. 19, 1996

Related U.S. Application Data

[62] Division of Ser. No. 390,395, Feb. 16, 1995, Pat. No. 5,563,187.

[51] Int. Cl.⁶ .................................................. C08L 83/00
[52] U.S. Cl. .................. 523/201; 524/2; 524/4; 524/5; 524/459; 524/503; 525/57; 525/902; 526/202
[58] Field of Search ............. 523/201; 524/459, 524/503, 2, 4, 5; 525/57, 902; 526/202

[56]         References Cited

U.S. PATENT DOCUMENTS

| | | | |
|---|---|---|---|
| 2,741,650 | 4/1956 | Lukman et al. | 524/459 |
| 2,861,051 | 11/1958 | Caldwell | 524/459 X |
| 3,083,172 | 3/1963 | Scott et al. | 524/459 X |
| 3,549,578 | 12/1970 | Ehmann | 524/459 |
| 3,755,234 | 8/1973 | Chujo et al. | 524/459 |
| 3,862,077 | 1/1975 | Schulz et al. | 524/459 X |
| 3,914,017 | 10/1975 | Bedell et al. | 524/459 X |
| 4,151,226 | 4/1979 | Morinaga et al. | 524/459 |
| 4,302,367 | 11/1981 | Cordes et al. | 524/25 |
| 4,339,548 | 7/1982 | Miyahara | 521/28 |
| 4,385,152 | 5/1983 | Boyack et al. | 524/460 |
| 4,539,362 | 9/1985 | Davies et al. | 524/459 X |
| 4,694,056 | 9/1987 | Lenney | 526/202 |
| 4,876,313 | 10/1989 | Lorah et al. | 525/281 |
| 5,100,949 | 3/1992 | Takahashi et al. | 524/459 |
| 5,126,411 | 6/1992 | Rauterkus et al. | 526/202 X |
| 5,240,771 | 8/1993 | Brueckmann et al. | 526/202 X |
| 5,284,900 | 2/1994 | Izubayashi et al. | 524/459 X |
| 5,286,801 | 2/1994 | Besecke et al. | 525/307 |
| 5,296,532 | 3/1994 | Haerzchel et al. | 524/459 X |
| 5,354,803 | 10/1994 | Dragner et al. | 524/459 X |
| 5,360,860 | 11/1994 | Itoh et al. | 524/459 X |
| 5,403,894 | 4/1995 | Tsai et al. | 525/285 |
| 5,519,084 | 5/1996 | Pak-Harvey et al. | 526/202 X |
| 5,567,750 | 10/1996 | Schulze et al. | 525/57 X |

FOREIGN PATENT DOCUMENTS

| | | |
|---|---|---|
| 0 338 486 A3 | 10/1989 | European Pat. Off. . |
| 0 627 450 A1 | 12/1994 | Germany . |
| WO 90/08786 | 8/1990 | WIPO . |

*Primary Examiner*—Judy M. Reddick
*Attorney, Agent, or Firm*—David T. Banchik

[57]         ABSTRACT

Aqueous emulsions of grafted polymer compositions are provided. The grafted component of these compositions has two or more polymeric substituents. The aqueous emulsions of grafted polymer compositions are particularly useful as cement modifiers.

6 Claims, No Drawings

GRAFTED POLYMER COMPOSITION

This is a divisional of application Ser. No. 08/390,395, filed Feb. 16, 1995, now U.S. Pat. No. 5,563,187 which has been allowed.

The present invention relates to a grafted polymer composition. In particular, the present invention relates to polymer compositions which have two or more polymeric substituents grafted thereto.

Emulsion polymers are known to be useful, for example, as cement modifiers. However, many previously known emulsion polymers intended for use as cement modifiers suffered some drawbacks with regard to their dispersibility or stability in the cement formulation.

One method for attempting to overcome the problem of dispersibility was to use polyvinyl alcohol as a protective colloid during the polymerization of the emulsion polymers as taught in Japanese Patent Application Number Hei 2-314117. However, the high viscosity of the polymerizations (greater than 50,000 centipoises, frequently greater than 100,000 centipoises) render them difficult to handle, and the particle size of the polymers produced (greater than 50 microns) were larger than the preferred particle size for cement modifiers.

Another attempt at overcoming the problems associated with polymeric cement modifiers was to add polyvinyl alcohol to the emulsion polymers and subsequently atomizing the mixture. When polyvinyl alcohol is added to cement modifier emulsion polymers, there is a tendency for phase separation. Also, the addition of polyvinyl alcohol to the emulsion tends to impart poor rheology characteristics and prolong the open time of cement compositions containing this mixture.

The present invention seeks to overcome the problems associated with known methods for providing redispersible polymers.

In a first aspect of the present invention, there is provided an emulsion polymer comprising a core, and grafted to said core a) at least one graftable water-soluble polymer and at least one graftable alkali-soluble polymer;

b) at least one graft copolymer comprising at least one graftable water-soluble polymer grafted with at least one graftable alkali-soluble polymer;

or c) a combination of (a) and (b).

In a second aspect of the present invention, there is provided a method for preparing an aqueous emulsion comprising emulsion polymerizing at least one monomer to form a core, in the presence of a) at least one graftable water-soluble polymer and at least one graftable alkali-soluble polymer;

b) at least one graft copolymer comprising at least one graftable water-soluble polymer grafted with at least one graftable alkali-soluble polymer;

or c) a combination of (a) and (b).

In a third aspect of the present invention, there is provided a graft copolymer comprising at least one graftable water-soluble polymer grafted with at least one graftable alkali-soluble polymer.

In a fourth aspect of the present invention, there is provided a cement composition comprising cement and the aqueous emulsion of the present invention.

Graftable water-soluble polymers are water-soluble polymers which are capable of becoming a graft substrate for another polymer, or capable of being grafted onto another polymer. Graftable water-soluble polymers useful in the present invention include water-soluble versions of, for example, polyvinyl alcohol, methyl cellulose, hydroxymethyl cellulose, hydroxyethyl cellulose, hydroxypropyl cellulose, starch derivatives, poly(ethylene glycol), poly(propylene glycol), poly(amino acids), other polycarboxylates, polyesters, polyurethanes, polyols, epoxy resins, urea resins, phenolic resins, and combinations thereof. Preferred graftable water-soluble polymers are polyvinyl alcohol, hydroxypropyl cellulose, poly(ethylene glycol), and combinations thereof. The most preferred graftable water-soluble polymers is polyvinyl alcohol.

When polyvinyl alcohol is used as a graftable water-soluble substrate, the polyvinyl alcohol preferably has a molecular weight of from 3,000 to 100,000, more preferably from 5,000 to 50,000. It is also preferred that when polyvinyl alcohol is used as a graftable water-soluble substrate, the polyvinyl alcohol is partially or fully hydrolyzed, most preferably from 80 to 100 percent hydrolyzed.

Graftable alkali-soluble polymers are alkali-soluble polymers which are capable of becoming a graft substrate for another polymer, or capable of being grafted onto another polymer. Graftable alkali-soluble polymers useful in the present invention include, for example, polymers comprising, as polymerized units, a sufficient amount of acid-functional monomer, anhydride-functional monomer, salts thereof or a combination thereof, to render the polymers alkali-soluble. Preferably, the graftable alkali-soluble polymers comprise, as polymerized units, acid-functional monomer, anhydride-functional monomer, salts thereof or a combination thereof, at a level of from 5 to 50 percent by weight of the graftable alkali-soluble polymer, most preferably from 10 to 35 percent by weight of the graftable alkali-soluble polymer. Preferred acid-functional monomers and anhydride-functional monomers include, for example, acrylic acid, methacrylic acid, crotonic acid, vinylacetic acid, 2-acrylamido-2methylpropanesulfonic acid, maleic acid, maleic anhydride, itaconic acid, mesaconic acid, fumaric acid, citraconic acid, alkali metal salts thereof and ammonium salts thereof. Preferably, the graftable alkali-soluble polymer comprises methacrylic acid.

The graftable alkali-soluble polymer further comprises, as polymerized units, at least one polyfunctional compound. Polyfunctional compounds useful for preparing the graftable alkali-soluble are selected from (i) compounds having at least two sites of ethylenic unsaturation, (ii) compounds having at least one site of ethylenic unsaturation and at least one abstractable atom, and (iii) compounds having at least two abstractable atoms. Such compounds, when incorporated into the graftable alkali-soluble polymer, impart one or more functional groups which are capable of grafting onto the core polymer.

Suitable polyfunctional compounds for preparing graftable alkali-soluble polymers include, for example, ethyleneglycol dimethacrylate, diethyleneglycol dimethacrylate, triethyleneglycol dimethacrylate, polyethyleneglycol dimethacrylate, polypropyleneglycol dimethacrylate, neopentylglycol dimethacrylate, 1,3-butyleneglycol diacrylate, neopentylglycol diacrylate, trimethylolethane trimethacrylate, dipentaerythritol triacrylate, dipentaerythritol tetraacrylate, dipentaerythritol pentaacrylate, 1,3-butyleneglycol dimethacrylate, trimethylolpropane trimethacrylate, trimethylolpropane triacrylate, tripropyleneglycol diacrylate, divinyl benzene, trivinyl benzene and the like.

Further suitable polyfunctional compounds for preparing graftable alkali-soluble polymers include, for example, allyl-, methallyl-, dicyclopentenyl-, crotyl- and vinyl esters of acrylic acid, methacrylic acid, maleic acid (mono- and di-esters), fumaric acid (mono- and all-esters) and itaconic acid (mono- and di-esters); N- or N,N di-, methallyl-, crotyl- and vinyl-amides of acrylic acid and methacrylic acid; N-methallyl and crotylmaleimide; alkenyl or cycloalkenyl esters of acrylic acid, methacrylic acid, maleic acid (mono- and di-esters), fumaric acid (mono- and di-esters), fumaric acid (mono- and di-esters), itaconic acid (mono- and di-esters); 1,3-butadiene; isoprene; divinyl benzene; methallyl-, crotyl- and allyl-mercaptan.

Further suitable polyfunctional compounds for preparing graftable alkali-soluble polymers include, for example, allyl esters, methallyl esters, vinyl esters, dicylopentenyl esters, and crotyl esters of acrylic acid, methacrylic acid, maleic acid (mono- and di-esters), fumaric acid (mono- and di-esters) and itaconic acid (mono- and di-esters); alkenyl and cycloalkenyl esters of acrylic, methacrylic, maleic (mono- and di-esters), fumaric (mono- and di-esters), and itaconic (mono- and di-esters) acids; allyl ether, methallyl ether, crotyl ether and vinyl ether; N-allyl amides, N,N-diallyl amides, and vinyl amides of acrylic acid and methacrylic acid; vinyl esters of 3-butenoic and 4-pentenoic acids; diallyl phthalate; triallyl cyanurate; O-allylphosphonate, methallylphosphonate, crotylphosphonate, O-alkylphosphonate, arylphosphonate, P-vinylphosphonate, P-allylphosphonate, P-crotylphosphonate, and P-methallylphosphonate; triallylphosphate, trimethallylphosphate, and tricrotylphosphate; O-vinylphosphate, O,O-diallylphosphate, dimethallylphosphate, and dicrotylphosphate; vinyl ethers and vinyl thioethers of cycloalkenols and cycloalkene thiols; vinyl esters of cycloalkene carboxylic acids; 1,3-butadiene, isoprene and other conjugated dienes; paramethylstyrene; chloromethylstyrene; allyl-, methallyl-, and crotyl-mercaptan; bromotrichloromethane; bromoform; carbon tetrachloride; and carbon tetrabromide.

Preferably, polyfunctional compounds are present at a level of from 1 to 25 percent by weight of the graftable alkali-soluble polymer, more preferably from 2 to 20 percent by weight of the graftable alkali-soluble polymer. When one or more compounds having at least two sites of ethylenic unsaturation are used as the polyfunctional compound, it is preferred that said compounds having at least two sites of ethylenic unsaturation are present at a level of less than 5 percent by weight, more preferably 0.5 to 3.0 percent by weight of the graftable alkali-soluble polymer. The most preferred polyfunctional compound is allyl methacrylate.

The graftable alkali-soluble polymer may optionally comprise, as polymerized units, at least one other monomer polymerizable with the monomers comprising the graftable alkali-soluble polymer. Preferred monomers polymerizable with the other monomers include, for example, alkyl esters of acrylic acid, alkyl esters of methacrylic acid, hydroxyalkyl esters of acrylic acid, hydroxyalkyl esters of methacrylic add, styrene, substituted styrenes, acrylamide, methacrylamide, substituted acrylamides and substituted methacrylamides. Preferably, the graftable alkali-soluble polymer comprises, as polymerized units, from 49 to 94 percent by weight of an alkyl acrylate or an alkyl methacrylate, most preferably methyl methacrylate.

A preferred graftable alkali-soluble polymer comprises, as polymerized units, (i) acid-functional monomer, anhydride-functional monomer, salts thereof or a combination thereof, at a level of from 5 to 50 percent by weight based on the weight of the graftable alkali-soluble polymer;

(ii) at least one polyfunctional compound at a level of from 1 to 25 percent by weight based on the weight of the graftable alkali-soluble polymer; and (iii) at least one alkyl acrylate or alkyl methacrylate at a level of from 49 to 94 percent by weight based on the weight of the graftable alkali-soluble polymer.

The graftable alkali-soluble polymer preferably has a weight average molecular weight of from 1,000 to 50,000, more preferably from 2,500 to 25,000. All molecular weights referred to herein and in the appended claims are as determined by aqueous gel permeation chromatography using a 4,500 molecular weight poly(acrylic acid) standard.

In general, and particularly when the polyfunctional compound used in the graftable alkali-soluble polymer has two or more sites of ethylenically unsaturation, it is desirable to use one or more chain transfer agents to control the molecular weight when preparing the graftable alkali-soluble polymer. The types and methods of using chain transfer agents or mixtures thereof is well known in the art. Particularly useful chain transfer agents include, for example, $C_1$-$C_6$ alkylmercaptans and $C_1$-$C_6$ alkyloxy mercaptans.

Monomers suitable for forming the core are any monomers capable of undergoing an emulsion polymerization. For example, any of the monomers suitable for use in preparing the graftable alkali-soluble polymer are suitable for use in preparing the core. Other suitable monomers include N,N-dimethylaminoethyl acrylate, N,N-dimethylaminoethyl methacrylate, N-[3-(dimethylamino)propyl]acrylamide, N-[3-(dimethylamino)propyl]methacrylamide, tert-butylaminoethyl methacrylate, (3-acrylamidopropyl)trimethylammonium chloride, (3-methacrylamidopropyl)trimethylammonium chloride, and N-[3-(dimethylamino)-2,2-dimethylpropyl]acrylamide. The selection of the particular monomer or combination thereof, and the relative amount of monomers for preparing the core is not critical to the present invention and will generally depend upon the properties sought for the application of the final polymer product. The selection of the monomer components for preparing the core to meet desired application properties is within the ordinary skill of the art of preparing emulsion polymers. Preferably, the core is prepared from a combination of monomers including alkyl acrylates, alkyl methacrylates and combinations thereof. When the core comprises polyfunctional compounds, as described above, said polyfunctional compounds are preferably used at a level of less than 2 percent by weight based on the total weight of the monomers used to prepare the core.

The process of the present invention is an aqueous emulsion process. Many aspects of emulsion polymerization are well known to those skilled in the art, such as the selection of the type and amount of initiator, the selection of the type and amount of emulsifiers (surfactants), the control of pH, the rate of addition of the various components, the polymerization temperature, the level of solids, the heating profile and the like.

In the process of the present invention, the monomers which are polymerized to form the core are polymerized in the presence of a grafting polymer. Grafting polymers are polymers which are capable of undergoing a grafting reaction with the core polymer under the conditions of the emulsion polymerization of the core. Suitable grafting polymers for the present invention include (a) a combination of at least one graftable water-soluble polymer and at least one graftable alkali-soluble polymer; (b) at least one graft copolymer comprising at least one graftable water-soluble polymer grafted with at least one graftable alkali-soluble polymer; and (c) a combination of (a) and (b).

In one embodiment of the present invention, the graftable alkali-soluble polymer is itself prepared in the presence of the graftable water-soluble polymer. By polymerizing the monomers which make up the graftable alkali-soluble polymer in the presence of the graftable water-soluble polymer, a graft copolymer of graftable alkali-soluble polymer and graftable water-soluble polymer is produced. In such an embodiment, the polymerization of the monomers which make up the graftable alkali-soluble polymer are preferably polymerized in an aqueous solution of the graftable water-soluble polymer using conventional emulsion polymerization techniques with regard to the aspects of emulsion polymerization described above. In a preferred embodiment, the monomers which make up the graftable alkali-soluble polymer are emulsion polymerized in an aqueous solution of polyvinyl alcohol to prepare the graft copolymer of the present invention.

The graft copolymer preferably comprises from 50 to 90, more preferably from 55 to 85, most preferably from 60 to 80 percent by weight of graftable alkali-soluble polymer based on the weight of the graft copolymer. Likewise, the graft copolymer preferably comprises from 50 to 10, more preferably from 45 to 15, most preferably from 40 to 20 percent by weight of graftable water-soluble polymer based on the weight of the graft copolymer.

The monomers which make up the core can be polymerized in the presence of the grafting polymers by (1) having the grafting polymers in the reactor prior to the addition of the monomers which make up the core, (2) adding the grafting polymers at one or more times during the addition of the monomers which make up the core, or (3) a combination thereof. Preferably, monomers which make up the core can be polymerized in the presence of the grafting polymers by (1) having the grafting polymers in the reactor prior to the addition of the monomers which make up the core.

The grafting polymers can be unneutralized, partially neutralized or completely neutralized. Preferably, the grafting polymers are partially or completely neutralized prior to the polymerization of the core. The neutralization can be done with any suitable base, such as alkali metal salts, alkaline earth metal salts, ammonia, amines and combinations thereof. Preferably, the grafting polymers are partially or completely neutralized with a combination of alkali metal salts and alkaline earth metal salts, most preferably with a combination of sodium salts and calcium salts. The preferred ratio of sodium ions to calcium ions is 100-0.01:1, more preferred is from 2-0.5:1, most preferred from 1.5-0.6:1. Preferably, the pH of is above 7, more preferably above 8 when the polymerization of the core begins. Partial or complete neutralization of the grafting copolymers prior to polymerization of the core helps prevent agglomeration during the polymerization of the core, and improves the grafting efficiency of the grafting polymers. The grafting efficiency is the percentage of graft copolymer, based on the total amount of grafting polymer, which becomes grafted to the core during the polymerization of the core. The grafting efficiency is usually less than 100 percent. Thus, a portion of the grafting polymer will remain in the aqueous phase of the emulsion. Preferably, the grafting efficiency is at least 10 percent, more preferably at least 15 percent based on the total amount of grafting polymer.

By polymerizing the monomers which make up the core in the presence of the grafting polymers, the emulsion polymer of the present invention is prepared. The emulsion polymer of the present invention comprises a core, and grafting polymers grafted to said core. The respective amounts of core and grafting polymer are preferably from 50 to 98 parts by weight core and from 2 to 50 parts by weight of grafting polymer, more preferably from 70 to 95 parts by weight core and from 5 to 30 parts by weight of grafting polymer, most preferably from 75 to 90 parts by weight core and from 10 to 25 parts by weight of grafting polymer.

The emulsion polymer of the present invention has an average particle size (diameter) less than 2 microns, more preferably less than 1.8 microns, most preferably less than 1.5 microns. The particle sizes reported herein are diameters as measured by a Brookhaven BI-90 Particle Sizer which employs a light scattering technique. The emulsion polymers of the present invention are substantially spherical.

The process of the present invention provides an aqueous emulsion of the polymers of the present invention. The aqueous emulsion is generally from 25 to 70 percent by weight polymer solids, preferably from 30 to 60 percent by weight polymer solids and more preferably from 35 to 55 percent by weight polymer solids. Known processes which utilize polyvinyl alcohol during the polymerization of monomers suffer from dramatic increases in viscosity during the polymerization. Such processes suffer from poor mixing, uncontrolled retention of heat and difficult handling of the product. The process of the present invention, which utilizes a grafting polymer, allows for high solids processes at substantially lower viscosities. Preferably, the viscosity of the aqueous emulsion of the present invention is below 5,000 centipoises ("cps"), more preferably from 50 to 2,000 cps at the more preferred level of polymer solids.

The emulsion polymers of the present invention are useful in the form of an aqueous emulsion and as a dried polymer powder such as a polymer powder prepared by spray drying. The emulsion polymers of the present invention are redispersible which makes them useful in many applications such as redispersible cement modifiers, redispersible adhesives, redispersible coatings, redispersible films, redispersible binders for caulks, mastics, floor polishes and the like. The emulsion polymers are particularly useful as cement modifiers.

In each of the examples which follow, unless stated otherwise: percentages are reported as percent by weight; "Particle Size" is reported as diameter in nanometers ("nm") as measured by a Brookhaven BI-90 Particle Sizer; "Solids" were measured as the percent by weight of a 1-2 gram sample remaining after the sample was placed in a 150° C. oven for 30 minutes; "viscosity" is reported in centipoises ("cps") as measured by a Brookfield viscometer using a #3 spindle at 60 revolutions per minute ("r.p.m."); "Wet Gel" is the amount, in grams, of gellular material remaining in a 150 micron screen after passing 1.0567 liters (one quart) of emulsion through the screen; "Grafting Efficiency" is the percentage of grafting polymer grafted to the core which is determined by subtracting from the total amount of grafting polymer the amount of grafting polymer which remained in the aqueous phase. To determine the amount of grafting polymer which remained in the aqueous phase, the emulsion was centrifuged at 20,000 r.p.m. for 2 hours and the supernatant was analyzed.

EXAMPLES

Example 1

Preparation of a Graft Copolymer of a Graftable Alkali-Soluble Polymer and a Graftable Water-Soluble Polymer To a 5-liter, 4-necked round bottom flask equipped with a mechanical stirrer, thermocouple, condenser, and nitrogen sparge was added 450 grams of deionized water and 24.3 grams of Airvol™203 (polyvinyl alcohol having a molecular weight of from 13,000 to 23,000, 88% saponified with sodium hydroxide, available from Air Products and Chemicals, Inc.) to form an aqueous solution of a graftable water-soluble polymer. This solution was heated to 85° C. A monomer emulsion (ME#1) was prepared by combining the components set forth in Table I below. An initiator solution was prepared by combining the components set forth in Table II below. While stirring the components of the kettle, ME#1 was added to the kettle followed by the initiator solution. After several minutes, the temperature of the kettle leveled off, a few grams of a catalyst solution containing t-butylhydroperoxide and sodium sulfoxylate formaldehyde was added to the kettle to reduce the residual monomer level in the graft copolymer. To the kettle was added the neutralizer slurry (as shown in Table III) to solubilize the graft copolymer.

TABLE I

| Materials | ME #1 |
| --- | --- |
| Deionized water | 145.00 |
| sodium dodecylbenzenesulfonate | 0.45 |
| Pluronic ™ L-31* | 13.50 |
| Methyl Methacrylate | 95.40 |
| Allyl Methacrylate | 1.80 |
| Methacrylic Acid | 24.30 |
| Methyl 3-mercaptopropionate | 4.25 |

*Pluronic ™ L-31 is a block ethylene oxide/propylene oxide copolymer available from BASF Corporation.

TABLE II

| | |
| --- | --- |
| 0.1 percent aqueous solution of FeSO$_4$.7H$_2$O | 9.0 g |
| 1 percent aqueous solution of ethylene diamine tetraacetic acid | 2.5 g |
| 8.2 percent aqueous solution of t-butyl hydroperoxide | 20.4 g |
| 7.9 percent aqueous solution of sodium sulfoxylate formaldehyde | 19.55 g |

TABLE III

| | |
| --- | --- |
| deionized water | 45.0 g |
| 50 percent aqueous solution of sodium hydroxide | 12.2 g |
| Ca(OH)$_2$ | 5.2 g |

Example 2

Preparation of an Emulsion Polymer Having a Graft Copolymer Grafted Thereto By Polymerizing in the Presence of a Graft Copolymer A monomer emulsion (ME#2) was prepared by combining the components set forth in Table IV below. To the kettle containing the graft copolymer prepared in Example 1 was added 50.0 grams of ME#2 and 12.85 grams of a 6.6 percent aqueous solution of ammonium persulfate. After the exotherm peaked, the remainder of ME#2 and 94.2 grams of a 4.5 percent aqueous solution of ammonium persulfate were separately added to the kettle at a constant rate over a period of two hours at a temperature in the range of 82°–86° C. The contents of the kettle temperature were then maintained at 82° C. for an additional fifteen minutes, then cooled to 65° C. Residual monomer levels were reduced by adding a few grams of a catalyst solution containing t-butylhydroperoxide and sodium sulfoxylate formaldehyde to the kettle. The emulsion polymer of the present invention prepared by Example 2 is characterized in Table V below.

TABLE IV

| Materials | ME #2 |
| --- | --- |
| Deionized water | 250.00 grams |
| Pluronic L-31 | 5.00 grams |
| sodium lauryl sulfate | 5.00 grams |
| Butyl Acrylate | 332.00 grams |
| Methyl Methacrylate | 332.00 grams |

TABLE V

| | |
| --- | --- |
| Solids | 42.4 |
| Particle Size | 498 nm |
| pH | 7.06 |
| Viscocity | 1866 cps |
| Wet Gel | 0.4 |
| Grafting Efficiency* | |
| Graftable Alkali-Soluble Polymer | 46 |
| Graftable Water-Soluble Polymer | 39 |

*Grafting efficiency of the graft copolymer was not measured directly.

Example 3

Polymerizing in the Presence of a Graftable Alkali-Soluble Polymer and a Graftable Water-Soluble Polymer To a 5-liter, 4-necked round bottom flask equipped with a mechanical stirrer, thermocouple, condenser, and nitrogen sparge was added 400 grams of deionized water. The water was heated to 85° C. A monomer emulsion (ME#1) was prepared by combining the components set forth in Table I above. An initiator solution was prepared by combining the components set forth in Table II above. While stirring the contents of the kettle, ME#1 was added to the kettle followed by the initiator solution. After several minutes, the temperature of the kettle leveled off, a few grams of a catalyst solution containing t-butylhydroperoxide and sodium sulfoxylate formaldehyde was added to the kettle to reduce the residual monomer level in the graft copolymer. To the kettle was added the neutralizer slurry (as shown in Table III above) to solubilize the graftable alkali-soluble polymer.

To the kettle was added 24.3 grams of Airvol™203.

A monomer emulsion (ME#2) was prepared by combining the components set forth in Table IV above. To the kettle was added 50.0 grams of ME#2 and 12.85 grams of a 6.6 percent aqueous solution of ammonium persulfate. After the exotherm peaked, the remainder of ME#2 and 94.2 grams of a 4.5 percent aqueous solution of ammonium persulfate were separately added to the kettle at a constant rate over a period of two hours at a temperature in the range of 82°–86° C. The contents of the kettle temperature were then maintained at 82° C. for an additional fifteen minutes, then cooled to 65° C. Residual monomer levels were reduced by adding a few grams of a catalyst solution containing t-butylhydroperoxide and sodium sulfoxylate formaldehyde to the kettle. The emulsion polymer of the present invention prepared by Example 3 is characterized in Table VI below.

TABLE VI

| Solids | 41.7 |
|---|---|
| Particle Size | 304 nm |
| pH | 7.05 |
| Viscosity | 372 cps |
| Wet Gel | 0.1 |
| Grafting Efficiency | |
| Graftable Alkali-Soluble Polymer | 50 |
| Graftable Water-Soluble Polymer | 45 |

Example 4

Polymerizing in the Presence of a Graftable Alkali-Soluble Polymer and a Graftable Water-Soluble Polymer To a 5-liter, 4-necked round bottom flask equipped with a mechanical stirrer, thermocouple, condenser, and nitrogen sparge was added 450 grams of deionized water. The water was heated to 85° C. A monomer emulsion (ME#1) was prepared by combining the components set forth in Table I above. An initiator solution was prepared by combining the components set forth in Table II above. While stirring the contents of the kettle, ME#1 was added to the kettle followed by the initiator solution. After several minutes, the temperature of the kettle leveled off, a few grams of a catalyst solution containing t-butylhydroperoxide and sodium sulfoxylate formaldehyde was added to the kettle to reduce the residual monomer level in the graft copolymer. To the kettle was added the neutralizer slurry (as shown in Table III above) to solubilize the graftable alkali-soluble polymer.

A monomer emulsion (ME#2) was prepared by combining the components set forth in Table VII below. To the kettle was added 50.0 grams of ME#2 and 12.85 grams of a 6.6 percent aqueous solution of ammonium persulfate. After the exotherm peaked, the remainder of ME#2 and 94.2 grams of a 4.5 percent aqueous solution of ammonium persulfate were separately added to the kettle at a constant rate over a period of two hours at a temperature in the range of 82°–86° C. The contents of the kettle temperature were then maintained at 82° C. for an additional fifteen minutes, then cooled to 65° C. Residual monomer levels were reduced by adding a few grams of a catalyst solution containing t-butylhydroperoxide and sodium sulfoxylate formaldehyde to the kettle. The emulsion polymer of the present invention prepared by Example 4 is characterized in Table VIII below.

TABLE VII

| Materials | ME #2 |
|---|---|
| deionized water | 250.00 |
| Airvol ™ 203 | 24.30 |
| Pluronic ™ L-31 | 5.00 |
| sodium lauryl sulfate | 5.00 |
| Butyl Acrylate | 332.00 |
| Methyl Methacrylate | 332.00 |

TABLE VIII

| Solids | 42.3 |
|---|---|
| Particle Size | 173 nm |
| pH | 7.11 |
| Viscosity | 298 cps |
| Wet Gel | 0.1 |

TABLE VIII-continued

| Grafting Efficiency | |
|---|---|
| Graftable Alkali-Soluble Polymer | 46 |
| Graftable Water-Soluble Polymer | 26 |

Example 5

Polymerizing in the Presence of an Unneutralized Graftable Alkali-Soluble Polymer and a Graftable Water-Soluble Polymer To a 5-liter, 4-necked round bottom flask equipped with a mechanical stirrer, thermocouple, condenser, and nitrogen sparge was added 450 grams of deionized water. The water was heated to 85° C. A monomer emulsion (ME#1) was prepared by combining the components set forth in Table I above. An initiator solution was prepared by combining the components set forth in Table II above. While stirring the contents of the kettle, ME#1 was added to the kettle followed by the initiator solution. After several minutes, the temperature of the kettle leveled off, a few grams of a catalyst solution containing t-butylhydroperoxide and sodium sulfoxylate formaldehyde was added to the kettle to reduce the residual monomer level in the graft copolymer.

A monomer emulsion (ME#2) was prepared by combining the components set forth in Table IX below. To the kettle was added 50.0 grams of ME#2 and 12.85 grams of a 6.6 percent aqueous solution of ammonium persulfate. After the exotherm peaked, the remainder of ME#2 and 94.2 grams of a 4.5 percent aqueous solution of ammonium persulfate were separately added to the kettle at a constant rate over a period of two hours at a temperature in the range of 82°–86° C. The contents of the kettle temperature were then maintained at 82° C. for an additional fifteen minutes, then cooled to 65° C. Residual monomer levels were reduced by adding a few grams of a catalyst solution containing t-butylhydroperoxide and sodium sulfoxylate formaldehyde to the kettle. When the contents of the kettle reached 45° C., the neutralizer slurry (as shown in Table III above) was added. The emulsion polymer of the present invention prepared by Example 5 is characterized in Table X below.

TABLE IX

| Materials | ME #2 |
|---|---|
| DI water | 250.00 |
| Arivol ™ 203 | 24.3 |
| Pluronic ™ L-31 | 5.00 |
| SLS | 5.00 |
| Butyl Acrylate (BA) | 344.00 |
| Methyl Methacrylate (MMA) | 344.00 |

TABLE X

| Solids | 33.4 |
|---|---|
| Particle Size | ~1.2 micron |
| pH | 7.51 |
| Viscosity | too viscous to measure |
| Wet Gel | would not filter |
| Grafting Efficiency | |
| Graftable Alkali-Soluble Polymer | 38 |
| Graftable Water-Soluble Polymer | 70 |

Example 6

Comparative—No Graftable Water-Soluble Polymer

The procedure of Example 4 was followed except that the monomer emulsion (ME#2) was as set forth in Table XI below. The emulsion polymer prepared by Comparative Example 6 is characterized in Table XII below.

TABLE XI

| Materials | ME #2 |
|---|---|
| deionized water | 250.00 |
| Pluronic ™ L-31 | 5.00 |
| sodium lauryl sulfate | 5.00 |
| Butyl Acrylate | 344.00 |
| Methyl Methacrylate | 344.00 |

TABLE XII

| Solids | 45.0 |
|---|---|
| Particle Size | 105 nm |
| pH | 7.03 |
| Viscosity | 32 cps |
| Wet Gel | 2.0 |
| Grafting Efficiency | |
| Graftable Alkali-Soluble Polymer | 49 |
| Graftable Water-Soluble Polymer | none |

Example 7

Comparative—No Graftable Alkali-Soluble Polymer

The procedure of Example 4 was followed except that the monomer emulsion (ME#2) was as set forth in Table XIII below. The emulsion polymer prepared by Comparative Example 6 is characterized in Table XIV below.

To a 5-liter, 4-necked round bottom flask equipped with a mechanical stirrer, thermocouple, condenser, and nitrogen sparge was added 600 grams of deionized water and 20.0 grams of Airvol™203. The water was heated to 85° C.

A monomer emulsion (ME) was prepared by combining the components set forth in Table XIII below. To the kettle was added 50.0 grams of ME and 10.4 grams of a 3.8 percent aqueous solution of ammonium persulfate. After the exotherm peaked, the remainder of ME and 94.5 grams of a 4.8 percent aqueous solution of ammonium persulfate were separately added to the kettle, at a temperature in the range of 82°–86° C., at a constant rate to provide a two hour feed time. The contents of the kettle gelled completely after one hour rendering further characterization unnecessary. Residual monomer levels were reduced by adding a several grams of a catalyst solution containing t-butylhydroperoxide and sodium sulfoxylate formaldehyde to the kettle.

TABLE XIII

| Materials | ME #2 |
|---|---|
| deionized water | 250.00 |
| Pluronic ™ L-31 | 5.00 |
| sodium lauryl sulfate | 5.00 |
| Butyl Acrylate | 332.00 |
| Methyl Methacrylate | 326.00 |
| Methacrylic acid | 6.00 |

The emulsion polymers prepared in Examples 2, 3, 4, 5 and 6 (comparative) were evaluated as cement modifiers. In addition, Example 8 (comparative) is included. Example 8 was conducted using an emulsion sample prepared according to Example 6 (comparative) to which 24.3 grams of Airvol™203 was added. Cement mortars were prepared according to the formulation set forth in Table XIV below. The results are set forth in Table XV below.

TABLE XIV

| Type I Portland cement | 100 grams |
|---|---|
| 60 mesh sand | 150 grams |
| Emulsion Polymer | 10 grams (based on polymer solids) |
| water | 40 grams (total including aqueous phase of Emulsion polymer) |

The following properties of the modified cements were evaluated:

Wet-out time: the time required for the mortar to reach a very workable consistency.

Open time: a period of time that the cement mortar remains flowable and trowelable.

Mortar rheology: mortar thickness after wet-out.

Retardation: a hardness rating evaluated by filling a 4-ounce cup with mortar, and penetrating a syringe needle into the cup after 24 hours at room temperature.

Thin section properties: a 1/16 inch (0.16 centimeter) thickness of mortar is placed on plywood and allow to cure for 24 hours. Toughness is rated qualitatively by scratching the center with a screw driver.

TABLE XV

| Example | 2 | 3 | 4 | 5 | Comp. 6 | Comp. 8 |
|---|---|---|---|---|---|---|
| Wet-out time (seconds) | 15 | 15 | 15 | 15 | 15 | 15 |
| Open time | ~30 minutes | ~30 minutes | ~40 minutes | >1 hour | >1 hour | >1 hour |
| Rheology | creamy | creamy | creamy | thick | v. thin | thin |
| Retardation | hard | hard | hard | med. hard | med. hard | med. hard |
| Thin Section Toughness | excellent | excellent | excellent | good | excellent | excellent |

We claim:

1. An emulsion polymer comprising a core and a grafted shell, said grafted shell selected from the group consisting of
   (a) at least one graftable water-soluble polymer and at least one graftable alkali-soluble polymer;
   (b) at least one graft copolymer comprising at least one graftable water-soluble polymer grafted with at least one graftable alkali-soluble polymer; and
   (c) a combination of (a) and (b).

2. The emulsion polymer of claim 1, wherein: the graftable water-soluble polymer is polyvinyl alcohol.

3. The emulsion polymer of claim 1, wherein: the graftable alkali-soluble polymer comprises, as polymerized units,
   (i) acid-functional monomer, anhydride-functional monomer, salts thereof or a combination thereof, at a level of from 5 to 50 percent by weight based on the weight of the graftable alkali-soluble polymer;

(ii) at least one polyfunctional compound at a level of from 1 to 25 percent by weight based on the weight of the graftable alkali-soluble polymer; and (iii) at least one alkyl acrylate or alkyl methacrylate at a level of from 49 to 94 percent by weight based on the weight of the graftable alkali-soluble polymer.

4. The emulsion polymer of claim 1, wherein: the grafted shell comprises from 2 to 50 percent by weight of the emulsion polymer.

5. A cement composition comprising cement and an aqueous emulsion comprising: water and an emulsion polymer comprising a core and a grafted shell, said grafted shell selected from the group consisting of (a) at least one graftable water-soluble polymer and at least one graftable alkali-soluble polymer;

(b) at least one graft copolymer comprising at least one graftable water-soluble polymer grafted with at least one graftable alkali-soluble polymer; and (c) a combination of (a) and (b).

6. A method for modifying cement compositions comprising adding to a cement composition an effective amount of an aqueous emulsion comprising: water and an emulsion polymer comprising a core and a grafted shell, said grafted shell selected from the group consisting of (a) at least one graftable water-soluble polymer and at least one graftable alkali-soluble polymer;

(b) at least one graft copolymer comprising at least one graftable water-soluble polymer grafted with at least one graftable alkali-soluble polymer; and (c) a combination of (a) and (b).

* * * * *